United States Patent [19]

Makino

[11] Patent Number: 5,151,811
[45] Date of Patent: Sep. 29, 1992

[54] LIGHT DEFLECTING APPARATUS
[75] Inventor: Jun Makino, Yokohama, Japan
[73] Assignee: Canon Kabushiki Kaisha, Tokyo, Japan
[21] Appl. No.: 839,715
[22] Filed: Feb. 24, 1992

Related U.S. Application Data

[63] Continuation of Ser. No. 512,197, Apr. 20, 1990, abandoned.

[30] Foreign Application Priority Data

Apr. 24, 1989 [JP] Japan .................................. 1-105455

[51] Int. Cl.⁵ ...................... G02B 26/08; G02B 27/00
[52] U.S. Cl. .................................. 359/198; 359/218; 359/900
[58] Field of Search .................................. 350/61–6.91, 350/255, 257, 568; 346/108, 160; 250/235, 236; 359/196–226, 507–514, 554, 557, 806, 808, 900

[56] References Cited

U.S. PATENT DOCUMENTS 4,410,233 10/1983 Gerhardt et al. .................... 359/212
4,796,963 1/1989 Yoshihura ............................ 350/6.5

FOREIGN PATENT DOCUMENTS

| 38724 | 3/1984 | Japan | 350/6.8 |
| 198421 | 11/1984 | Japan | 350/6.8 |
| 156033 | 8/1985 | Japan | 350/6.8 |
| 261315 | 10/1988 | Japan | 359/513 |
| 261317 | 10/1988 | Japan | 359/212 |
| 207713 | 8/1989 | Japan | 350/6.7 |
| 2-72518 | 11/1990 | Japan | 359/218 |

Primary Examiner—Bruce Y. Arnold
Assistant Examiner—Thong Nguyen
Attorney, Agent, or Firm—Fitzpatrick, Cella, Harper & Scinto

[57] ABSTRACT

A light deflecting apparatus has an optical box carrying a light source unit for emitting a light beam, a light deflecting unit and an optical system for converging the light beam deflected by the light deflecting unit. The apparatus also has a mounting base on which the optical box is mounted. The mounting of the optical box to the mounting base is accomplished in such a manner as to enable the optical box to be rotated on the mounting base for position adjustment in such a manner as to align the best image surface with the surface of an object to be scanned.

31 Claims, 7 Drawing Sheets

BEST IMAGE SURFACE

SCANNED SURFACE

LIGHT DEFLECTING APPARATUS

This application is a continuation of application Ser. No. 07/512,197, filed Apr. 20, 1990, now abandoned.

BACKGROUND OF THE INVENTION

1. Field of the Invention

The present invention relates to a light deflecting apparatus which incorporates a light deflecting unit such as a rotary polygon mirror. More particularly, the present invention is concerned with a construction for mounting, on a mounting base, an optical box which contains a light source unit, the light deflecting unit and an optical system for converging the light deflected by the light deflecting unit.

2. Description of the Related Art

In general, a light deflecting apparatus used in an image recording apparatus such as a laser beam printer is composed of two parts: namely, an optical box in which optical components of a scanning system including a light source, a rotary polygon mirror and an fθ lens are integrated as a unit; and a main part (mounting base) to which the optical box is mounted. In this type of light deflecting apparatus, it is often experienced that the scanning line is deviated from the aimed position due to, for example, inferior precision in machining and installation. Therefore, known light deflecting apparatus of the kind described are provided with an adjusting mechanism for enabling adjustment of the position of the scanning line. Such an adjusting mechanism, for example, is designed to enable adjustment of mounting position of the optical box to the mounting base. The known adjusting mechanisms, however, are not designed to enable the mounting position to be rotated in a deflection plane which is the plane drawn by the light beam deflected by the deflection unit. Thus, the known light deflecting apparatus do not have any means which enable correction of any inclination of the best, or optimum, image surface where good light spots are obtained with respect to the scanned surface such as the surface of a photo-sensitive drum. This is because the above-mentioned inclination can be maintained within a tolerance through enhancing machining and precisely setting the optical components, since about ±6 mm offset from the focal position is acceptable to maintain a laser beam spot diameter of 100 μm or so.

In case of modern precision light deflecting apparatus in which a very small spot diameter of 40 μm or so is required, the tolerance of the offset from the focal position is as small as ±0.8 mm. Therefore, correction of the inclination of the scanned surface from the best image surface requires very high machining and mounting precision of the optical parts if the correction has to be effected by improvement in the machining and mounting precision alone. To meet such a requirement, machining and mounting has to be conducted with very high precision, with the result that the cost of the apparatus is undesirably raised. Even if the inclination is set small enough to maintain the deviation within the required tolerance of the offset from the focal position, there still exists a problem that the spot diameter is increased beyond the allowable limit at local portions of the scanned surface, because a sufficiently large margin for offset from the focal position cannot be obtained over the entire area of the scanned surface.

SUMMARY OF THE INVENTION

Accordingly, an object of the present invention is to provide a light deflecting apparatus which can overcome the above-described problems of the prior art.

In accordance with one aspect of the invention, a light deflecting apparatus comprises an optical box, a light source unit for emitting a light beam and a light deflecting unit mounted in the optical box and capable of deflecting the light beam. An optical system is mounted in the optical box and can converge the light beam deflected by the deflecting unit, and also provided is a mounting base on which the optical box is rotatably mounted.

In accordance with another aspect of the invention, an image recording apparatus comprises an optical box, a light source unit for emitting a light beam and a light deflecting unit mounted in the optical box and capable of deflecting the light beam. An optical system is mounted in the optical box and can converge the light beam deflected by the deflecting unit. Also provided is a mounting base on which the optical box is rotatably mounted, and a photosensitive member on which the light beam deflected by the light deflecting unit is converged through the optical system.

In accordance with a further aspect of the invention, a method of adjusting a light deflecting apparatus comprises the steps of securing a light deflecting unit for deflecting a light beam and an optical system for converging the light beam deflected through the light deflecting unit to an optical box, mounting the optical box on a mounting base, adjusting the position of the optical box relative to the mounting base through rotational movement of the optical box with respect to the mounting base, and fixing the optical box to the mounting base in a locked position.

In accordance with a further aspect of the invention, a method of adjusting a light deflecting apparatus comprises the steps of providing an optical box having a light deflecting unit for deflecting a light beam and an optical system for converging the light beam deflected by the light deflecting unit, providing a reference mounting base, mounting the optical box to the reference mounting base, adjusting the position of the optical box with respect to the reference mounting base by rotating the optical box relative to the reference mounting base, fixing a connecting portion of the optical box through which the optical box is mounted on the reference mounting base in a locked position, and demounting the optical box from the reference mounting base. Further steps include providing a reference optical box having a light deflecting unit for deflecting a light beam and an optical system for converging the light beam deflected by the light deflecting unit, mounting the reference optical box to a mounting base, adjusting the position of the reference optical box with respect to the mounting base by rotating the reference optical box relative to the mounting base, fixing a connecting portion of the mounting base at which the mounting base is connected to the reference optical box in a locked position, disconnecting the mounting base from reference optical box, and mounting the optical box on the mounting base.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
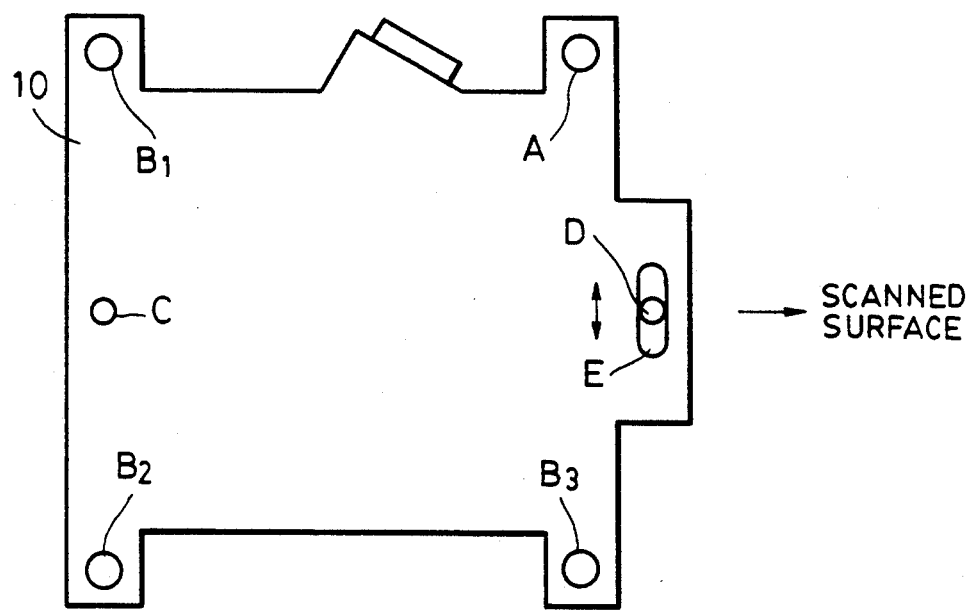
FIGS. 1(a), 1(b) and 1(c), respectively, are a bottom plan view, a top plan view and a side elevational view of an optical box incorporated in a first embodiment of the light deflecting apparatus in accordance with the present invention.
Figure 1:
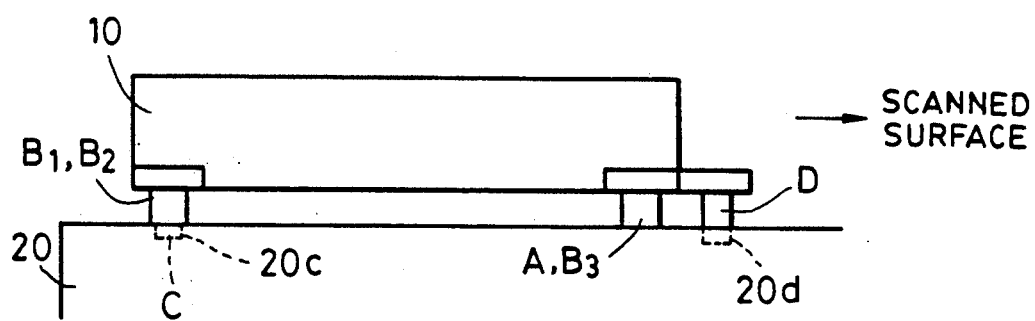
Figure 1B:
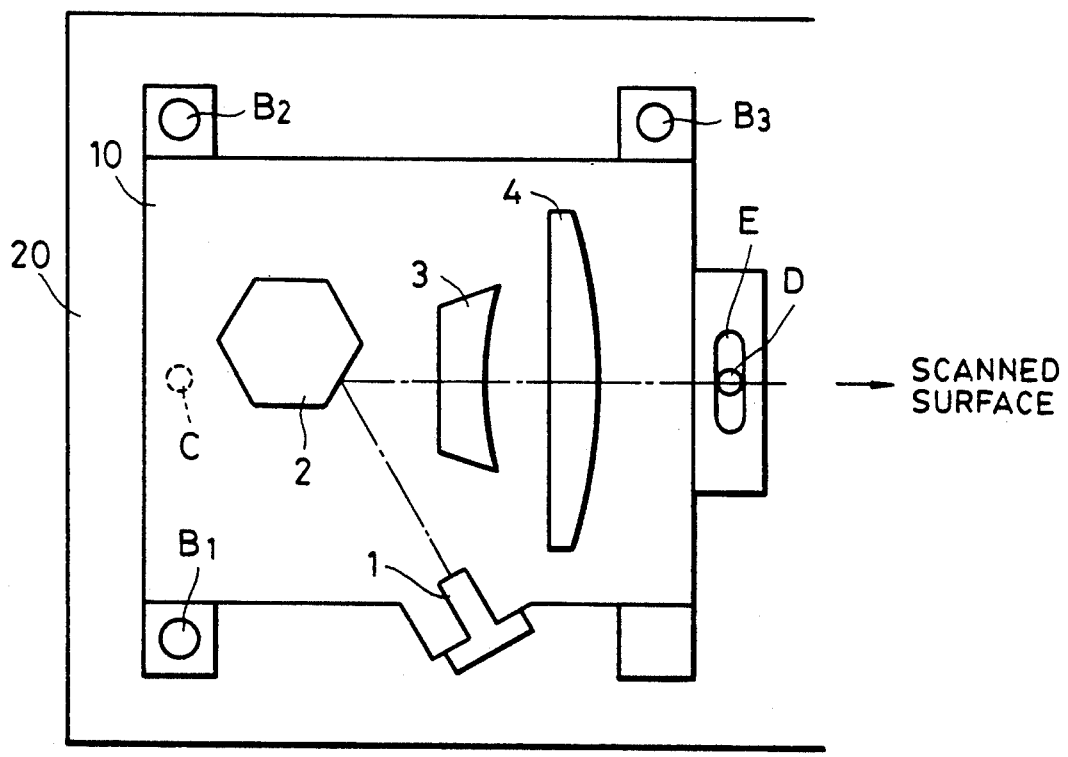

A first embodiment of the light deflecting apparatus of the present invention will be described with reference to the accompanying drawings. FIG. 1(a) is a bottom plan view of an optical box 10, showing the bottom surface of the optical box 10 at which the optical box 10 is to be mounted on a mounting base 20 (FIG. 1(b)). FIG. 1(b) is a top plan view of the optical box showing the top surface of the optical box carrying components of a scanning optical system such as a rotary polygon mirror 2, fθ lens 3,4 and so forth. FIG. 1(c) is a side elevational view of the optical box 10.

Referring to these Figures, there are four pins on the optical box 10: namely, a height reference pin A and other pins $B_1$, $B_2$ and $B_3$ having screw threads. The pins $B_1$, $B_2$ and $B_3$, therefore, are height adjustable in the direction perpendicular to the plane of the sheet of the drawing of FIGS. 1(a) and 1(b). It is possible to move the optical box 10 in a direction perpendicular to the deflection plane by means of these pins $B_1$, $B_2$ and $B_3$. It is possible to adjust the position (height) of the scanning line by means of the pins A, $B_1$, $B_2$ and $B_3$ by suitably varying the level of the optical box 10 with respect to the mounting base 20. A locating pin C for locating the optical box 10 with respect to the mounting base 20 during mounting thereof is fixed to the surface of the optical box 10 and faces the mounting base 20.

The optical box 10 has an elongated hole or slot E which receives a pin D movable along the slot E. After the optical box is moved to an aimed position, the pin D is fixed to the optical box 10 by means of, for example, a screw. The optical box 10 is secured to the mounting base with the pins C and D aligned with holes 20c and 20d which are formed in the mounting base 20. The scanning optical system carried by the optical box 10 includes a light source unit 1 (FIG. 1(b)) having a semiconductor laser as a light source and a collimator lens for collimating a diverging beam emitted from the semiconductor laser, a rotary polygon mirror 2 as a light deflecting unit for deflecting the light beam from the light source unit, and an optical system including a pair of single lenses 3,4 which serves as an fθ lens for converging the light beam deflected by the light deflecting unit. The light source unit 1, rotary polygon mirror 2 and the fθ lens 3,4 are secured to the optical box 10.

Figure 2:
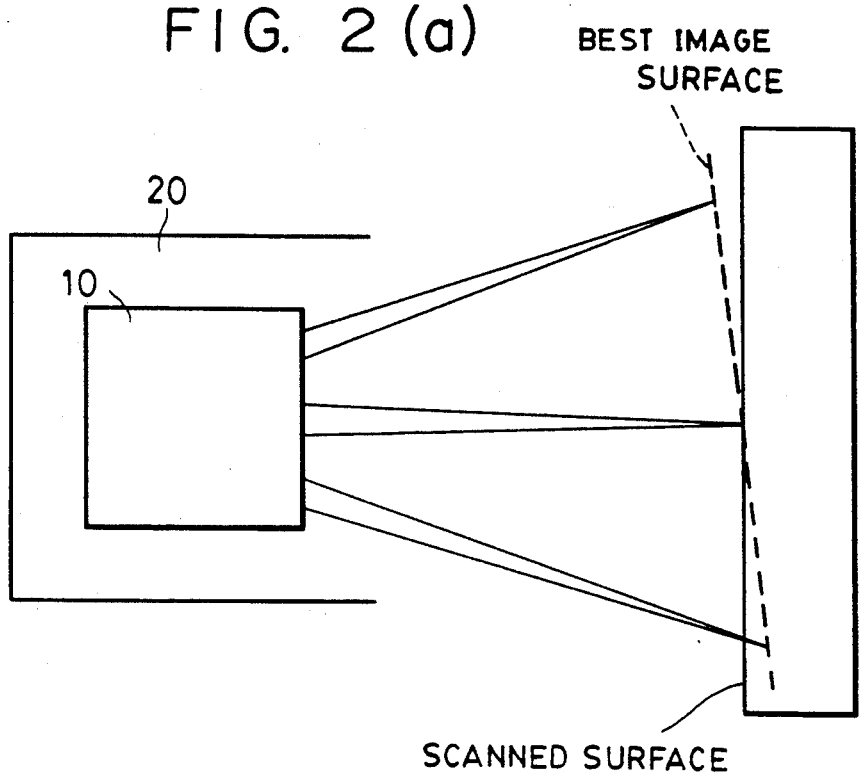
FIGS. 2(a) and 2(b) are schematic illustrations for explaining the effect produced by the embodiment.
Figure 2:
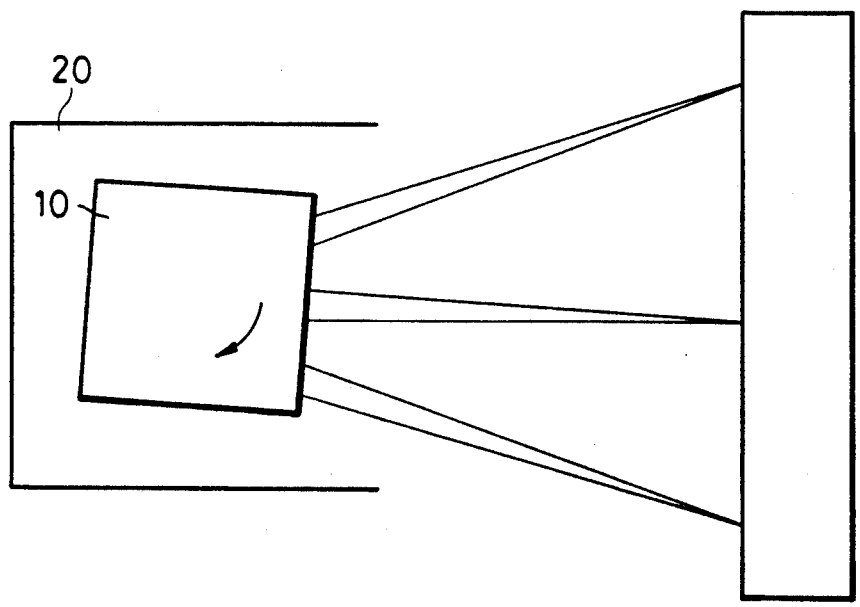

FIG. 2(a) shows a state in which the best image surface over which good uniform spots are obtainable is inclined with respect to the surface which is actually scanned, due to inferior machining and mounting precision of the optical components mentioned above. In this embodiment, however, the optical box 10 is rotatable within the deflection plane about the axis of the pin C by moving the pin D along the slot E with respect to the optical box, so as to bring the best image surface into alignment with the actually scanned surface. After the optical box 10 has been rotated about the pin C to a position where the best image surface coincides with the scanned surface, the pin D is fixed to the optical box by means of, for example, a screw which is not shown. The adjustment of the position or height of the scanning line is conducted by means of the pins $B_1$, $B_2$ and $B_3$. After completion of the adjustment, the optical box is fastened to the mounting base by means of screws (not shown).

Demounting and replacement of the optical box may become necessary when, for example, any trouble occurs in the optical box. To enable such replacement, the adjustment of the optical box is carried out by making use of a reference mounting base which is a mounting base with a shape and dimensions strictly conforming with the design. A plurality of optical boxes as independent units are adjusted using this reference mounting base, in the manner described above. Namely, each optical box is mounted on the reference mounting base, rotated within the deflection plane to a position where the best image surface coincides with the scanned surface, and then the pin D is fixed to the optical box by means of the screw not shown. The position or height of the a scanning line also is adjusted by using the pins $B_1$, $B_2$ and $B_3$. Heights of the pins C and D is also determined by using the reference mounting base. Similarly, a plurality of mounting bases as independent units are adjusted in regard to the positions of the holes for receiving the locating pins C and D, by using a reference optical box which is an optical box having a construction which strictly conforms with the design. One of the optical boxes adjusted with reference to the reference mounting base mentioned above is set on one of the mounting bases which has been adjusted with reference to the reference optical box, whereby a light-deflecting apparatus is assembled. Thus, optical boxes as independent units are adjusted with reference to the reference mounting base, while mounting bases as independent units are adjusted with reference to the reference optical box regardless of the adjustment of the optical boxes. Replacement of a failed optical box with a new one on an actual machine, therefore, can be conducted without difficulty.

As will be understood from the foregoing description, the present invention also provides a method of adjusting a light-deflecting apparatus comprising the steps of: securing to an optical box a light deflecting unit for deflecting a light beam and an optical system for converging the light beam deflected through said light deflecting unit; mounting the optical box on a mounting base; adjusting the position of said optical box relative to the mounting base through a rotational movement of said optical box with respect to said mounting base; and fixing said optical box to said mounting base in a locked position.

The invention also provides a method of adjusting a light deflecting apparatus comprising the steps of: providing an optical box having a light deflecting unit for deflecting a light beam and an optical system for converging the light beam deflected by the light deflecting unit; providing a reference mounting base; securing the optical box to the reference mounting base; adjusting the position of the optical box with respect to the reference mounting base by rotating the optical box relative to the reference mounting base; fixing a connecting portion of the optical box through which the optical box is mounted on the mounting base in a locked position; demounting the optical box from the reference mounting base; providing a reference optical box carrying a light deflecting unit for deflecting a light beam and an optical system for converging the light beam deflected by the light deflecting unit; securing the reference optical box to a mounting base; adjusting the position of the reference optical box with respect to the mounting base by rotating the reference optical box relative to the mounting base; fixing a connecting portion of the mounting base at which the mounting base is connected to the reference optical box in a locked position; disconnecting the mounting base from the reference optical box; and mounting the optical box on the mounting base.

In the embodiment described above in connection with FIGS. 1(a) to 1(c), the light source unit is secured to the optical box. This, however, is only illustrative and the light source unit may be mounted on a member other than the optical box, e.g., on the mounting base. The adjustment for making the best surface coincide with the scanned surface can also be conducted in such a case.

Figure 3A:
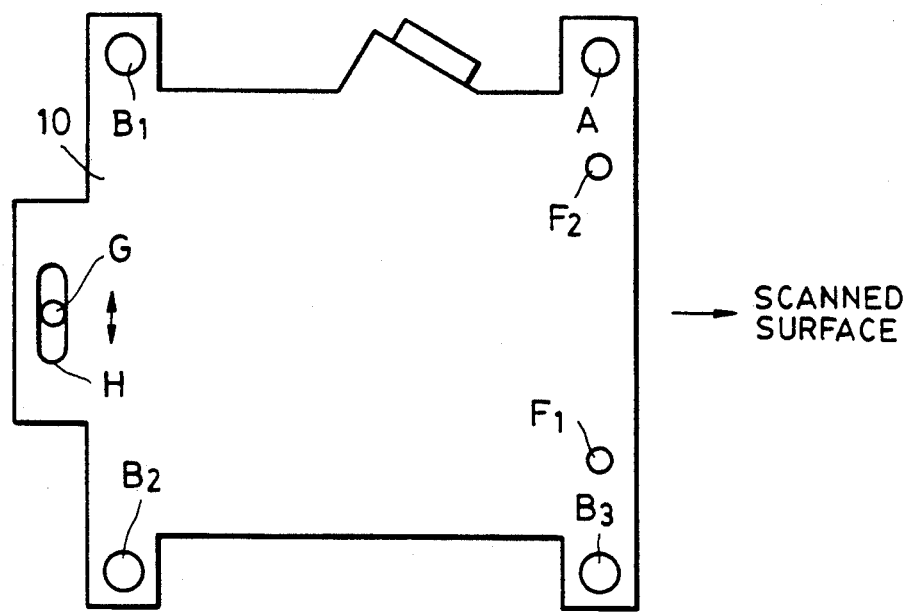
FIGS. 3(a) and 3(b), respectively, are a bottom view and a top plan view of an optical box in a second embodiment of the light deflecting apparatus of the present invention.
Figure 3B:
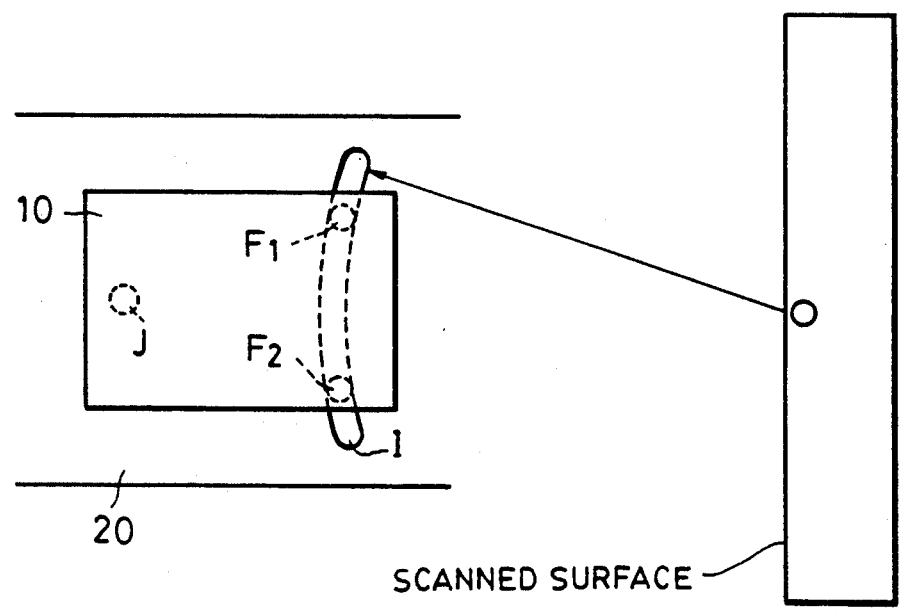

Although in this embodiment the pin D closer to the scanned surface is made adjustable while the pin C remote from the scanned surface is fixed, this arrangement may be modified as shown in FIG. 3(a) such that the pin D closer to the scanned surface is fixed while the remote pin C is made adjustable. In FIG. 3(a), the pin G is moved within slot H at the back of the optical box 10. As another alternative, FIG. 3(b) shows an optical box using two pins $F_1$, $F_2$ moving within elongated slot I.

In the described embodiment, the axis of the fixed pin C, i.e., the axis of rotation of the optical box, is set in a plane which contains the optical axis of the fθ lens 3, 4 and which is perpendicular to the plane of the light deflection. This arrangement enables adjustment of the best surface without impairing symmetry of the scanning line.

Obviously, the described embodiments also may be modified such that the fixed pin and the adjustable pin D are provided on the mounting base, while the holes for receiving these pins are formed on the optical box.

Figure 4A:
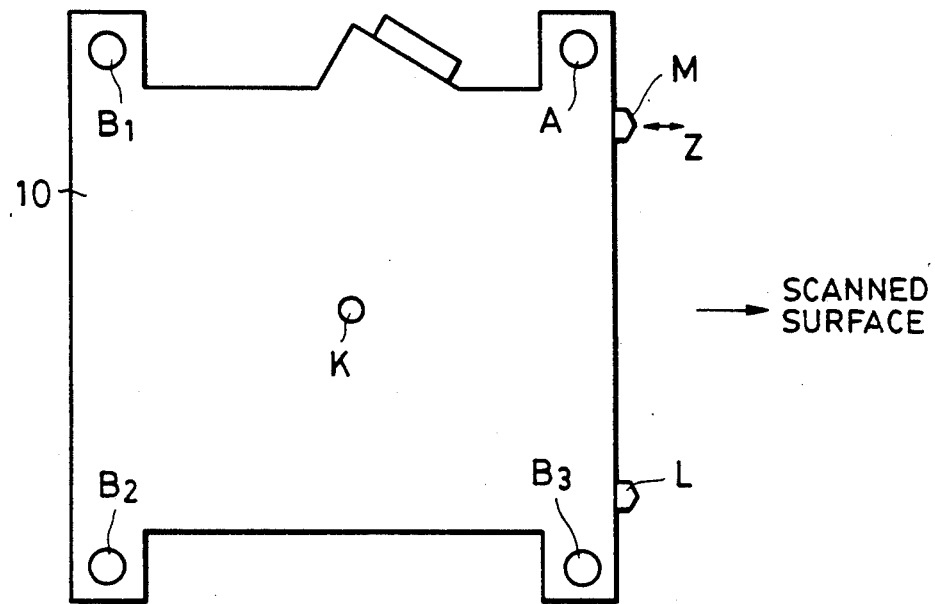
FIGS. 4(a) and 4(b), respectively, are a bottom plan view and a top plan view of an optical box in a third embodiment of the light deflecting apparatus of the present invention.
Figure 4B:
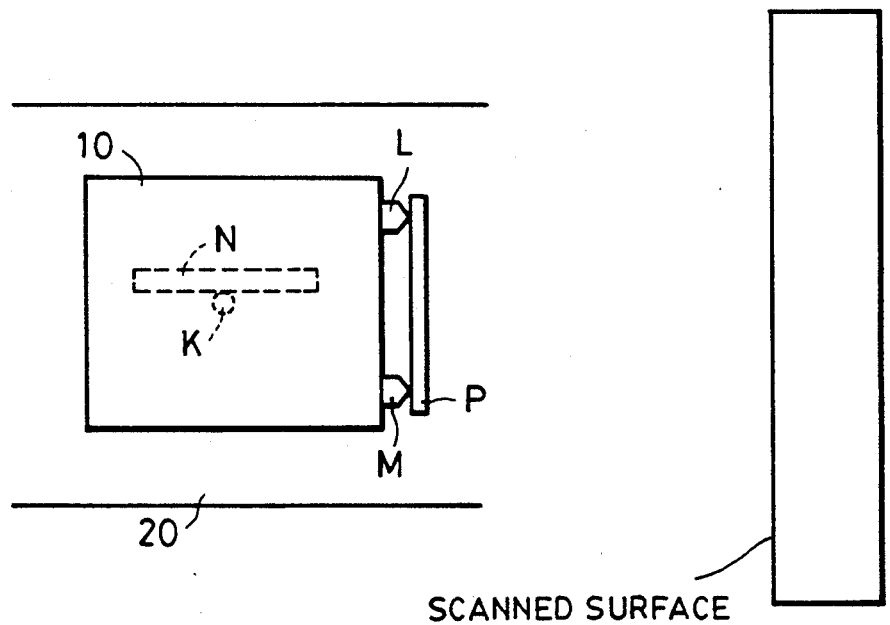

A third embodiment of the light-deflecting apparatus of the present invention will be described with reference to FIGS. 4(a) and 4(b). FIGS. 4(a) is a bottom plan view of the optical box 10 showing the surface to be mounted on the mounting base 20, while FIG. 4(b) is a schematic illustration of the optical box 10 secured to the mounting base 20. This embodiment employs a pin K for adjusting the position in the transverse direction, i.e., in a direction substantially parallel to the scanned surface, and a pair of pins L and M for locating the optical box 10 in a direction substantially perpendicular to the scanned surface. The pin K is fixed to the optical box 10. The pin L also is fixed to the optical box 10 but the other pin M is movable such that it is adjustable towards and away from the scanned surface as indicated by arrow. On the other hand, the mounting base 20 has a guide line N for determining the position of the optical box in the transverse direction and a guide line P for determining the position of the optical box in the direction substantially perpendicular to the scanned surface. Thus, the pin K abuts the guide line N so as to determine the position of the optical box 10 in the transverse direction, while the pins L and M abuts the guide line P so as to determine the position of the optical box 10 in the direction substantially perpendicular to the scanned surface, whereby the optical box is optimumly located. It will be seen that a movement of the pin M in the directions of arrow enables the optical box 10 to be pivoted about the end of the pin L so as to optimize the position of the best image surface in relation to the scanned surface.

A description will now be given of an embodiment of an image recording apparatus which incorporates a light deflecting apparatus of the invention described before.

Figure 5:
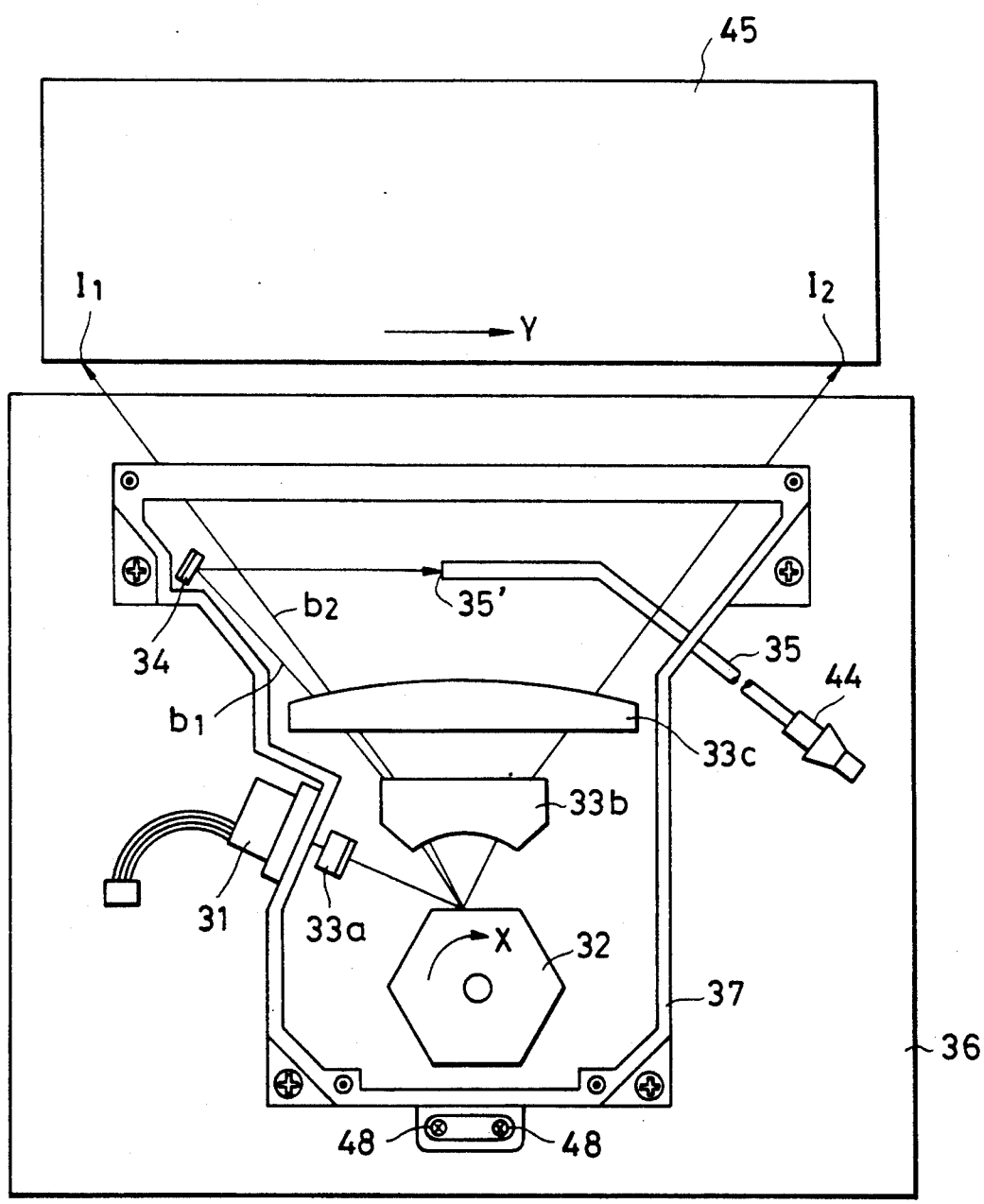
FIG. 5 is a top plan view of an image recording apparatus incorporating the light deflecting apparatus of the present invention, with the top cover of the optical box being removed.
Figure 6:
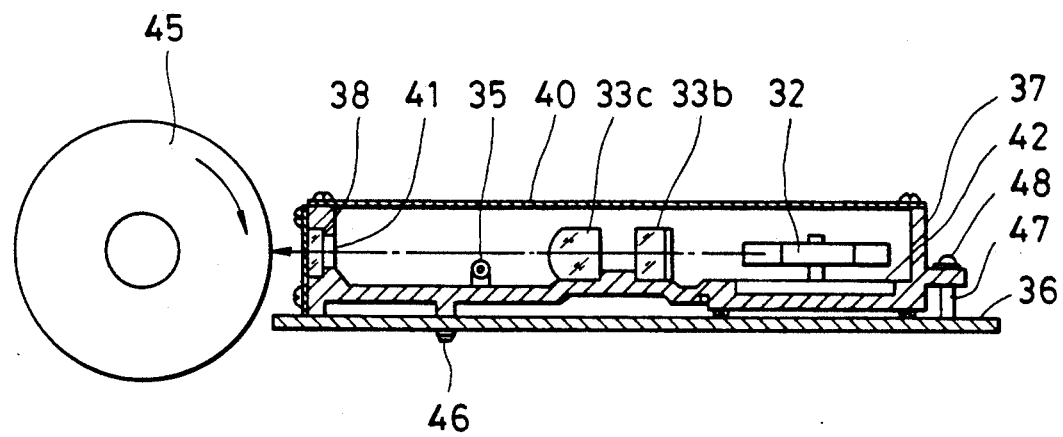
FIG. 6 is a sectional side elevational view of the image recording apparatus shown in FIG. 5.

FIG. 5 is a plan view of the image recording apparatus with a top cover of the optical box removed, while FIG. 6 is a sectional side elevational view of the apparatus.

The image recording apparatus has the following components: a semiconductor laser unit 31 as a light source unit; a rotary polygon mirror 32 for deflecting and oscillating a laser beam emitted from the semiconductor laser unit 31 for enabling the beam to scan; a collimator lens 33a for collimating the laser beam; condenser lenses 33b, 33c for converging the collimated laser beam so as to form a scanning beam spot on the surface of an electrophotographic photosensitive drum 45; a fixed mirror 34 for deflecting the scanning beam from the rotary polygon mirror 32 towards a light-receiving surface 35' of a synchronizing signal generating means, before the beam enters the starting end of an image recording region ($I_1$ to $I_2$) on the drum 45; and an optical fiber 35 having the light-receiving surface 35' located at a position at which the laser beam is focused through the lenses 33b, 33c and which the distance travelled by the laser beam to reach the light-receiving surface 35' and to reach the drum 45 is the same.

These components 31 to 35 are encased in an optical box 37. The optical box has a wall with a beam-transmitting window 41 formed therein and covered by a dust preventing glass plate 38. The optical box 37 also has a top cover 40 for closing and opening the upper end of the box 37. Numeral 42 denotes a motor for driving the rotary polygon mirror 32 in the direction of an arrow X.

The light-receiving or incident surface 35' of the optical fiber 35 is disposed below the path of the scanning beam which moves in the direction of an arrow Y, preferably within the range of beam movement corresponding to the recording region ($I_1$ to $I_2$) mentioned before. When the beam has reached a position $b_1$ immediately before reaching a position $b_2$ corresponding to one end $I_1$ of the recording region, the beam is reflected by the mirror 34 so as to impinge upon the incident surface 35' of the optical fiber 35. Thus, the beam also scans a substantially central portion of the incident surface 35' and is transmitted to a photo-diode 44 through the fiber 35. Upon receipt of the beam, the photo-diode 44 generates a signal and, when a predetermined time has elapsed after the generation of this signal, an operation is started for modulating the condition of driving of the semiconductor laser with information to be recorded, whereby scanning with an intensity-modulated beam is commenced from the end $I_1$ of the recording region.

Numeral 36 denotes a mounting base for mounting the optical box 37. A locating pin 46 for locating the optical box 37 with respect to the mounting base 36 is fixed to the surface of the optical box 37 which faces the mounting base. Numeral 47 denotes a pin which is movable along an elongated slot in a direction parallel to the scanning line along which the beam scans the surface of the photosensitive drum as the scanning object. The pin 47, after being set to an optimum position along the slot, is fixed to the optical box 37 by means of a screw 48.

After the assembly of the image recording apparatus, the best surface be inclined to the surface to be scanned. In such a case, the entire optical box 37 can be pivoted about the pin 46 by movement of the pin 47 relative to the optical box 37, thus enabling the best image surface to be scanned.

As has been described, according to the present invention, the optical box is mounted on the mounting base in such a manner that the optical box is rotatable with respect to the mounting base, thereby enabling adjustment of position of the best image surface over which uniform and good beam spots are obtainable. It is therefore possible to realize a light deflecting apparatus which can scan the entire scanning region with the best and constant beam spot size over the entire region of scanning against any change in the environmental condition, without requiring impractically high precision of machining and installation of the optical components, i.e., without substantially raising the production cost.

Although the invention has been described through specific terms, it is to be understood that the described embodiments are only illustrative and various changes and modifications may be imparted thereto without departing from the scope of the present invention which is limited solely by the appended claims.

What is claimed is:

1. A light deflecting apparatus comprising:
   an optical box;
   a light source unit for emitting a light beam;
   a light deflecting unit mounted in said optical box and capable of deflecting the light beam in a deflection plane to scan a surface with an image surface of the light beam;
   an optical system mounted in said optical box and capable of converging the light beam deflected by said deflecting unit; and
   a mounting base on which said optical box is rotatably mounted, wherein said optical box is mounted for rotation within the light deflection plane to adjust the inclination of the image surface with the surface to be scanned.

2. A light deflecting apparatus according to claim 1, wherein said light source unit is mounted in said optical box.

3. An optical box according to claim 1, wherein said optical box is secured to said mounting base for movement in a direction perpendicular to said light deflection plane.

4. A light deflecting apparatus according to claim 1, wherein a rotational axis of said optical box is in a plane including an optical axis of said optical system and is perpendicular to said light deflection plane.

5. A light deflecting apparatus according to claim 1, wherein said optical box is rotatable around a center of the scanned surface within said light deflection plane.

6. An image recording apparatus comprising:
   an optical box;
   a light source unit for emitting a light beam;
   a light deflecting unit mounted in said optical box and capable of deflecting the light beam in a deflection plane to scan a surface with an image surface of the light beam;
   an optical system mounted on said optical box and capable of converging the light beam deflected by said deflecting unit;
   a mounting base on which said optical box is rotatably mounted, wherein said optical box is mounted for rotation within the light deflection plane to adjust the inclination of the image surface with the surface to be scanned; and
   a photosensitive member to be scanned by the light beam deflected by said light deflecting unit.

7. An image recording apparatus according to claim 6, wherein a rotational axis of said optical box is within a plane including an optical axis of said optical system and is perpendicular to said light deflection plane.

8. An image recording apparatus according to claim 6, wherein said optical box is rotatable around a center of the surface of said photosensitive member within said light deflection plane.

9. An image recording apparatus according to claim 6, wherein said optical box is secured to said mounting base for movement in a direction perpendicular to the light deflection plane.

10. A method of adjusting a light deflecting apparatus comprising the steps of:
    securing a light deflecting unit for deflecting a light beam in a deflection plane to scan a surface with an image surface of the light beam and an optical system for converging the light beam deflected through the light deflecting unit to an optical box;
    mounting the optical box on a mounting base for rotation within the light deflection plane to adjust the inclination of the image surface with the scanned surface;
    adjusting the position of the optical box relative to the mounting base through rotational movement of the optical box with respect to the mounting base; and
    fixing the optical box to the mounting base in a locked position.

11. A method of adjusting a light deflecting apparatus comprising the steps of:
    providing an optical box having a light deflecting unit for deflecting a light beam in a deflection plane to scan a surface with an image surface of the light beam and an optical system for converging the light beam deflected by the light deflecting unit;
    providing a reference mounting base;
    mounting the optical box to the reference mounting base;
    adjusting the position of the optical box with respect to the reference mounting base;
    fixing a connecting portion of the optical box through which the optical box is mounted on the reference mounting base in a locked position;
    demounting the optical box from the reference mounting base;
    providing a reference optical box having a light deflecting unit for deflecting a light beam and an optical system for converging the light beam deflected by the light deflecting unit;

mounting the reference optical box to a mounting base;

adjusting the position of the reference optical box with respect to the mounting base by rotating the reference optical box relative to the mounting base;

fixing a connecting portion of the mounting base at which the mounting base is connected to the reference optical box in a locked position;

disconnecting the reference optical box from the mounting base;

mounting the optical box on the mounting base.

12. A light deflecting apparatus comprising:
an optical box having a locating member for adjusting movement of said optical box;
a light source unit for emitting a light beam;
a light deflecting unit mounted in said optical box for deflecting the light beam;
an optical system mounted in said optical box for directing the deflected light beam in a light-deflection plane toward a predetermined plane; and
a mounting base on which said optical box is rotatably mounted, said mounting base having a fixing member, in contact with said locating member to regulate rotation of said optical box in the light-deflection plane.

13. A light deflecting apparatus according to claim 12, wherein said optical box is rotatably mounted on said mounting base in the light deflection plane in order to adjust the inclination between a scanned surface and an optimum image surface of the deflected light beam.

14. A light deflecting apparatus according to claim 12, wherein said optical box rotates about an axis perpendicular to the light deflection plane.

15. A light deflecting apparatus according to claim 14, wherein said optical box is secured to said mounting base for movement in a direction perpendicular to the light deflection plane.

16. An image recording apparatus comprising:
an optical box having a locating member for adjusting movement of said optical box;
a light source unit for emitting a light beam;
a light deflecting unit mounted in said optical box for deflecting the light beam;
a photosensitive member to be scanned by the deflected light beam;
an optical system mounted in said optical box for directing the deflected light beam in a light-deflection plane to said photosensitive member; and
a mounting base on which said optical box is rotatably mounted, said mounting base having a fixing member in contact with said locating member to regulate rotation of said optical box in the light-deflection plane.

17. An image recording apparatus according to claim 16, wherein said optical box is rotatably mounted on said mounting base in the light deflection plane in which the light beam is deflected in order to adjust the inclination between a surface of said photosensitive member and an optimum image surface of the deflected light beam.

18. An image recording apparatus according to claim 16, wherein said optical box rotates about an axis perpendicular to the light deflection plane.

19. An image recording apparatus according to claim 16, wherein said optical box is secured to said mounting base for movement in a direction perpendicular to the light deflection plane.

20. A light deflecting apparatus comprising:

an optical box having a first locating member for adjusting movement of said optical box and a fixed second locating member;
a light source unit for emitting a light beam;
a light deflecting unit mounted in said optical box for deflecting the light beam;
an optical system mounted in said optical box for directing the deflected light beam in a light-deflection plane to a predetermined plane; and
a mounting base on which said optical box is rotatably mounted, said mounting base having a fixing member in contact with said first locating member to regulate rotation of said optical box in the light-deflection plane.

21. A light detecting apparatus according to claim 20, wherein said optical box is rotatably mounted on said mounting base in the light deflection plane in which the light beam is deflected in order to adjust the inclination between a surface of said photosensitive member and an optimum image surface of the deflected light beam.

22. A light deflecting apparatus according to claim 21, wherein said optical box is secured to said mounting base for movement in a direction perpendicular to the light deflection plane.

23. A light deflecting apparatus according to claim 21, wherein said optical box rotates around the second locating member.

24. A light detecting apparatus according to claim 20, wherein said optical box rotates about an axis perpendicular to the light deflection plane.

25. A image recording apparatus comprising:
an optical box having a first locating member for adjusting movement of said optical box and a fixed second locating member;
a light source unit for emitting a light beam;
a light deflecting unit mounted in said optical box for deflecting the light beam;
a photosensitive member;
an optical system mounted in said optical box for directing the deflected light beam in a light-deflection plane to said photosensitive member plane; and
a mounting base on which said optical box is rotatably mounted, said mounting base having a fixing member in contact with said first locating member to regulate rotation of said optical box in the light-deflection plane.

26. An image recording apparatus according to claim 25, wherein said optical box is rotatably mounted on said mounting base in the light deflection plane in which the light beam is deflected in order to adjust the inclination between a surface of said photosensitive member and an optimum image surface of the deflected light beam.

27. An image recording apparatus according to claim 25, wherein said optical box rotates about an axis perpendicular to the light deflection plane.

28. A light deflecting apparatus according to claim 25, wherein said optical box is secured to said mounting base for movement in a direction perpendicular to the light deflection plane.

29. An image recording apparatus according to claim 25, wherein said optical box rotates around said second locating member.

30. A method of adjusting a light deflecting apparatus comprising the steps of:
providing an optical box having a light deflecting unit;

emitting a light beam toward the light deflecting unit to be deflected in a deflection plane to scan a surface with an image surface of the light beam;

converging the light beam deflected by the light deflecting unit with an optical system;

adjusting the position of a locating member to move the optical box and align the optical system;

providing a mounting base having a connecting portion;

adjusting the position of the connecting portion with respect to the locating member; and mounting the optical box on the mounting base.

31. A method of adjusting a light deflecting apparatus comprising the steps of:

providing an optical box having a light deflecting unit for deflecting a light beam in a deflection plane to scan a surface with an image surface of the light beam, an optical system for converging the light beam deflected by the light deflecting unit and a locating member for adjusting movement of the optical box;

adjusting the position of the locating member with respect to the optical box;

providing a mounting base having a connecting portion;

adjusting the position of the connecting portion with respect to the mounting base; and mounting the optical box on the mounting base.

* * * * *

UNITED STATES PATENT AND TRADEMARK OFFICE
CERTIFICATE OF CORRECTION

PATENT NO. : 5,151,811
DATED : September 29, 1992
INVENTOR(S) : Jun Makino It is certified that error appears in the above-identified patent and that said Letters Patent is hereby corrected as shown below:

COLUMN 9:

Line 10, "base;" should read --base; and--.

COLUMN 10:

Line 15, "detecting" should read --deflecting--.
    Line 28, "detecting" should read --deflecting--.

Signed and Sealed this

Sixteenth Day of November, 1993

Attest:

BRUCE LEHMAN

Attesting Officer    Commissioner of Patents and Trademarks